(12) United States Patent
Joshi

(10) Patent No.: US 7,660,310 B1
(45) Date of Patent: Feb. 9, 2010

(54) INDEX PROCESSING

(75) Inventor: Mayank Joshi, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 916 days.

(21) Appl. No.: 10/875,785

(22) Filed: Jun. 23, 2004

(51) Int. Cl.
*H04L 12/56* (2006.01)
*G06F 17/00* (2006.01)
*G06F 12/00* (2006.01)

(52) U.S. Cl. .................. 370/394; 370/395.32; 370/412; 707/100; 707/200

(58) Field of Classification Search .................. 370/389, 370/473, 474; 707/100–102, 200, 204, 205
See application file for complete search history.

(56) References Cited

U.S. PATENT DOCUMENTS

| | | | | |
|---|---|---|---|---|
| 5,566,170 A | * | 10/1996 | Bakke et al. ................. | 370/392 |
| 6,021,409 A | * | 2/2000 | Burrows ...................... | 707/102 |
| 6,047,286 A | * | 4/2000 | Burrows ........................ | 707/4 |
| 6,834,310 B2 | * | 12/2004 | Munger et al. .............. | 709/232 |
| 7,379,954 B2 | * | 5/2008 | Shoens ........................ | 707/205 |
| 7,383,268 B2 | * | 6/2008 | Krokosz ...................... | 707/101 |
| 2002/0107877 A1 | * | 8/2002 | Whiting et al. ............. | 707/204 |
| 2003/0076825 A1 | * | 4/2003 | Guruprasad ................. | 370/389 |
| 2003/0108056 A1 | * | 6/2003 | Sindhu et al. ............... | 370/401 |
| 2004/0054697 A1 | * | 3/2004 | Tsaur et al. .................. | 707/204 |
| 2005/0041659 A1 | * | 2/2005 | Paul et al. .................... | 370/389 |

* cited by examiner

*Primary Examiner*—Tri H Phan
(74) *Attorney, Agent, or Firm*—Van Pelt, Yi & James LLP

(57) ABSTRACT

In an embodiment of the invention, a technique for indexing data is disclosed. The technique comprises receiving packets; counting the received packets; determining whether there is a pattern associated with the received packets; and using a first algorithm if it is determined that there is a pattern.

51 Claims, 6 Drawing Sheets

INDEX PROCESSING

FIELD OF THE INVENTION

The present invention relates generally to computers, more specifically to the area of data backups.

BACKGROUND OF THE INVENTION

Computers are now typically backed up on a regular basis. There can be many situations where it may be desirable to recover a specific file or a set of files that is less than the entire directory. A situation may also arise where it may be desirable to recover something that is less than the whole of what is stored in the backup storage medium. In such cases, an index identifying the contents of a particular storage medium can be used to assist in the recovery of a portion of what has been backed up.

A problem with the use of such indexes is the time that it can take to process and create the index. As the amount of backed up information becomes larger, the time it takes to create and process an associated index can grow exponentially. It would be desirable to have a more efficient technique for indexing the backed up information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
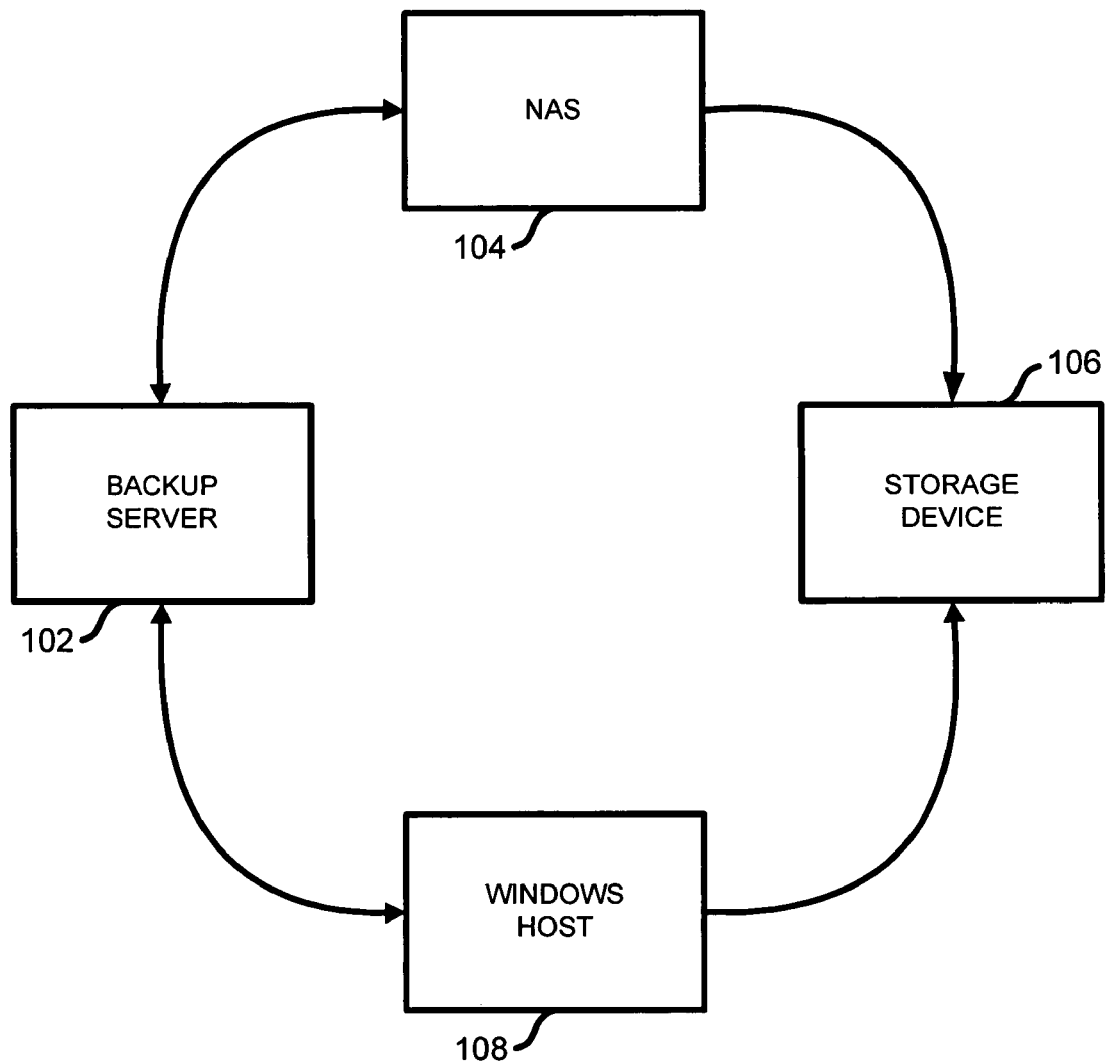
FIG. 1 is a block diagram of an example of a system for data backup according to some embodiments.

FIG. 1 is a block diagram of an example of a system for data backup, such as backups performed using Network Data Management Protocol (NDMP), according to one embodiment. In the example shown in FIG. 1, a storage device 106, such as a tape drive, is shown to be coupled with data devices 104 and 108. Data devices 104 and 108 are shown to download backup data to storage device 106. Data devices 104 and 108 can be any system with information to be backed up to storage device 106. For example, data device 108 is shown to be a computer system running a Windows operating system, while data device 104 is shown to be a network attached storage (NAS) device. A NAS device is a device capable of storing data. It is desirable to backup NAS devices as well as other computers in the network.

In the example shown in FIG. 1, the NAS device 104 is coupled with a backup server 102. When the NAS device 104 sends content to be backed up in the storage device 106, it can also send information related to the backup to the backup server 102, according to some embodiments. Although for illustrative reasons, the technique described herein is discussed with the information related to the backup content being sent to the backup server 102, the technique can alternatively be performed in the data devices 104 and 108, or the storage device 106. For example, backup-related information could be sent to a backup server module located within the data devices 104 or 108. Likewise, the technique could be performed in the storage device 106 or another device coupled with the storage device 106. Also for illustrative reasons, the examples herein refer to the NAS device 104 sending the backup-related information to the backup server 102, however, the technique can be applied to any device, such as a device using a Windows operating system or Unix system, that backs up its data, or any open systems behaving as NAS device such as a system using NDMP protocol. Details related to the metadata sent to the backup server 102 will be discussed in conjunction with the remaining figures.

Figure 2:
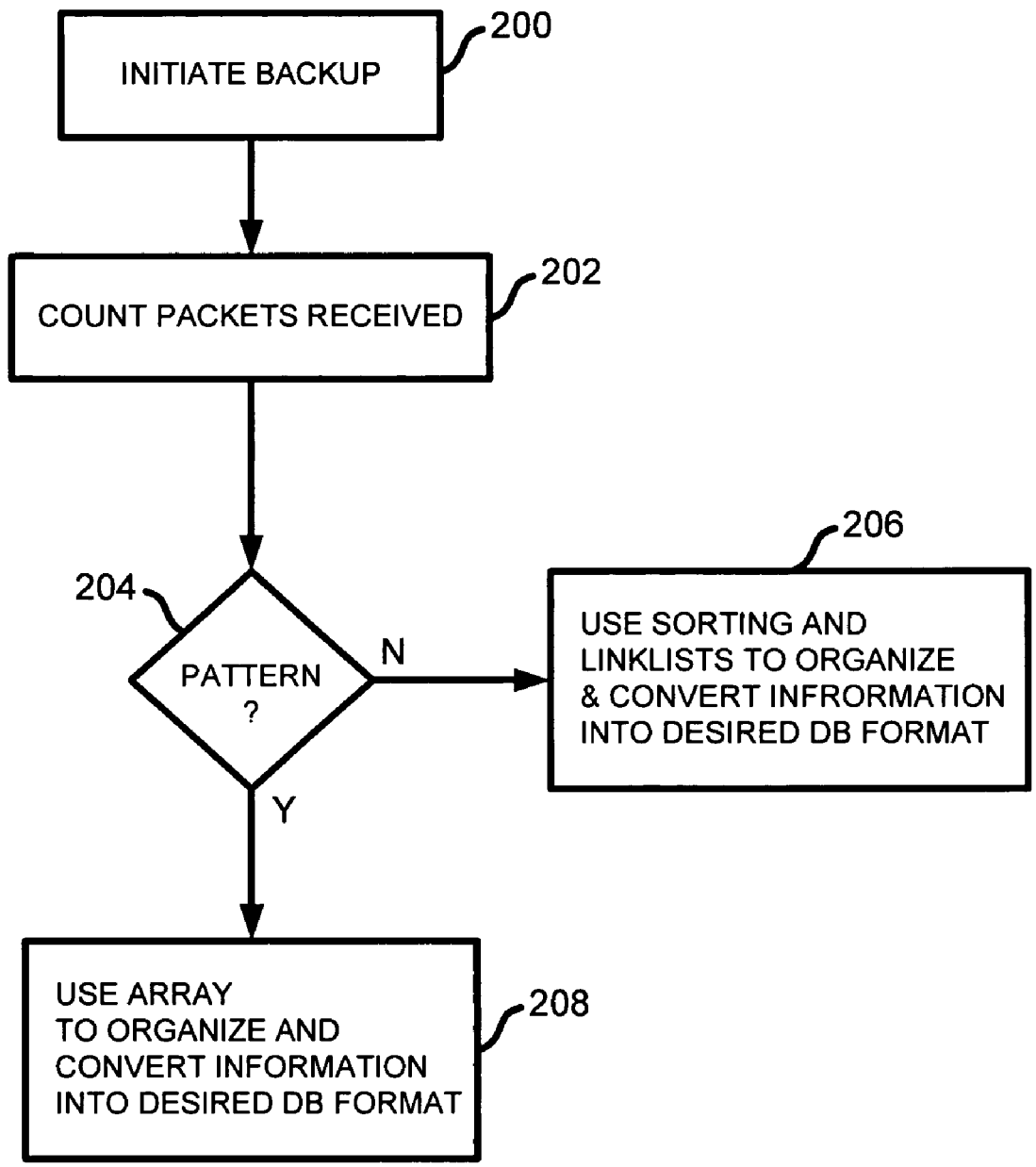
FIG. 2 is a flow diagram of a method according to some embodiments for indexing backup information.
Figure 3A:
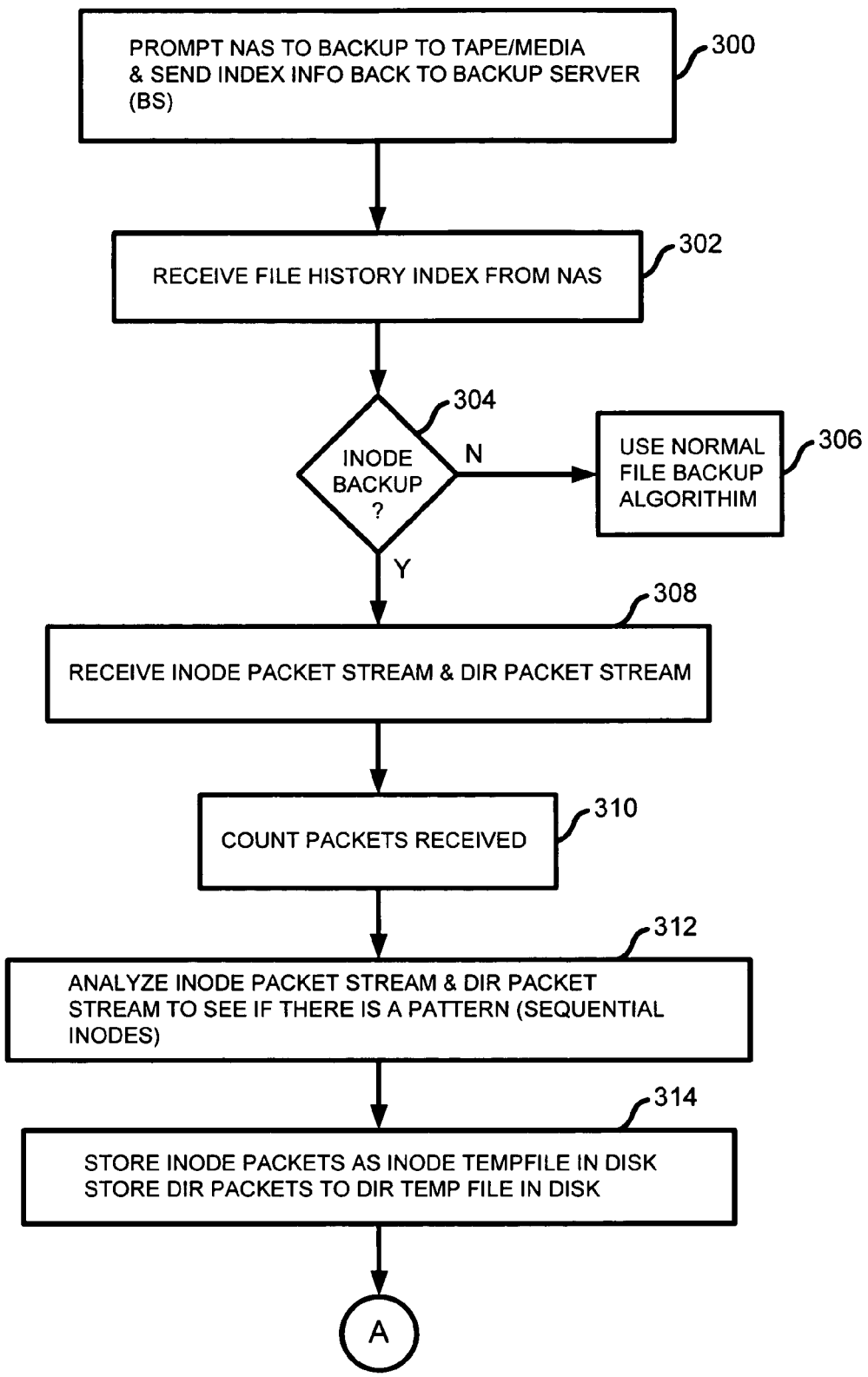
FIGS. 3A-3D are flow diagrams of a method of processing an index according to some embodiments.
Figure 3B:
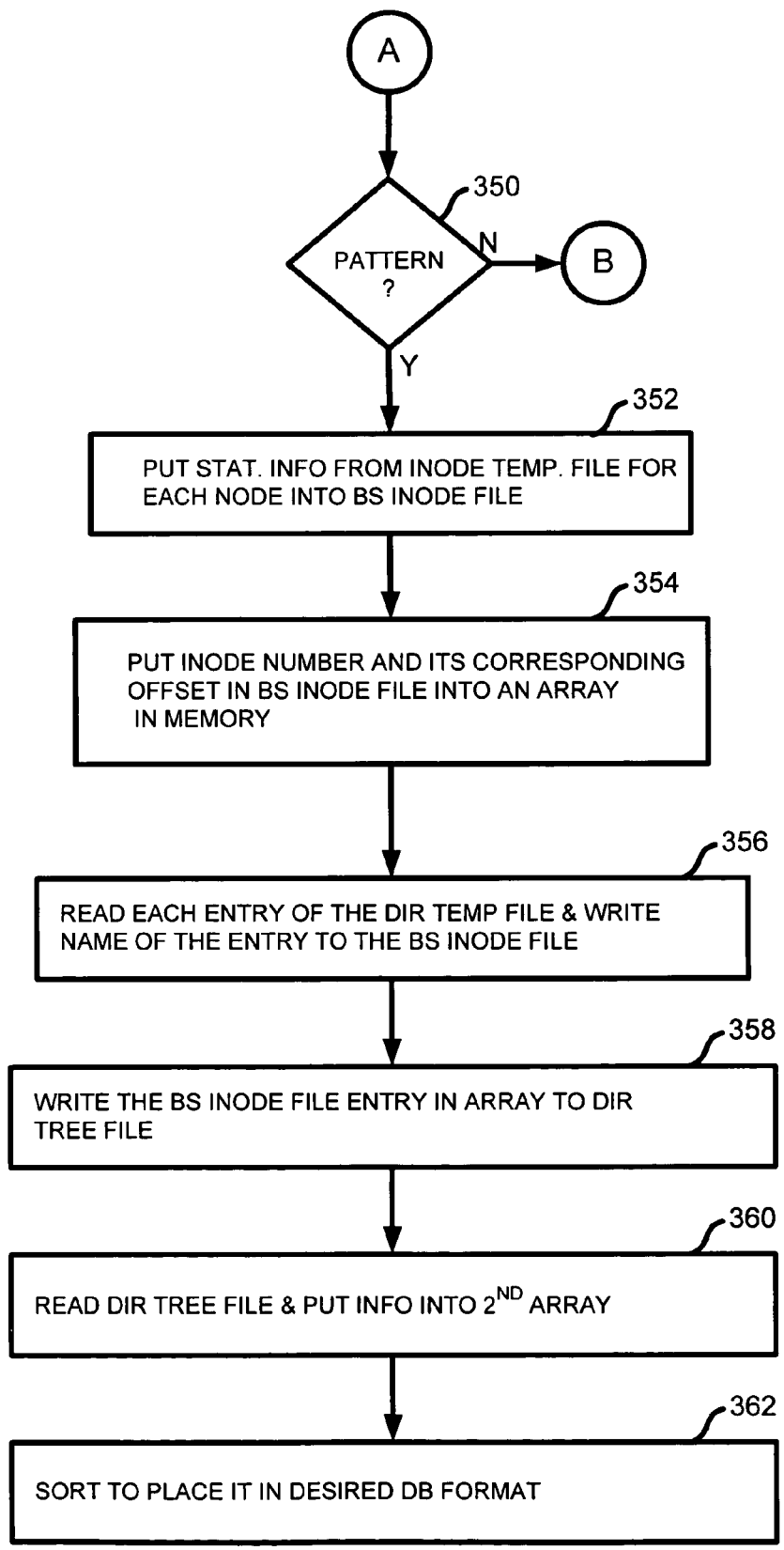
Figure 3C:
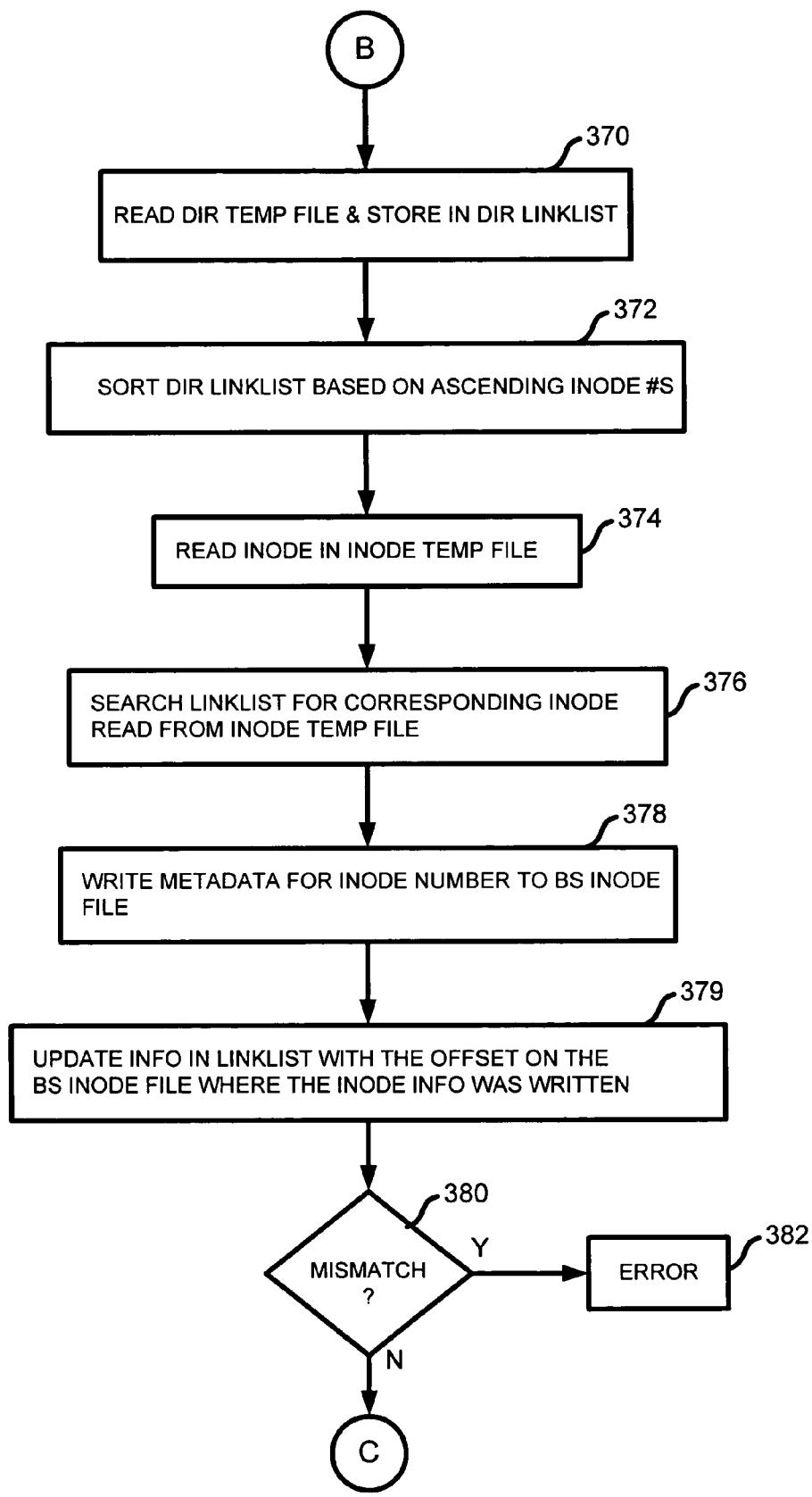
Figure 3D:
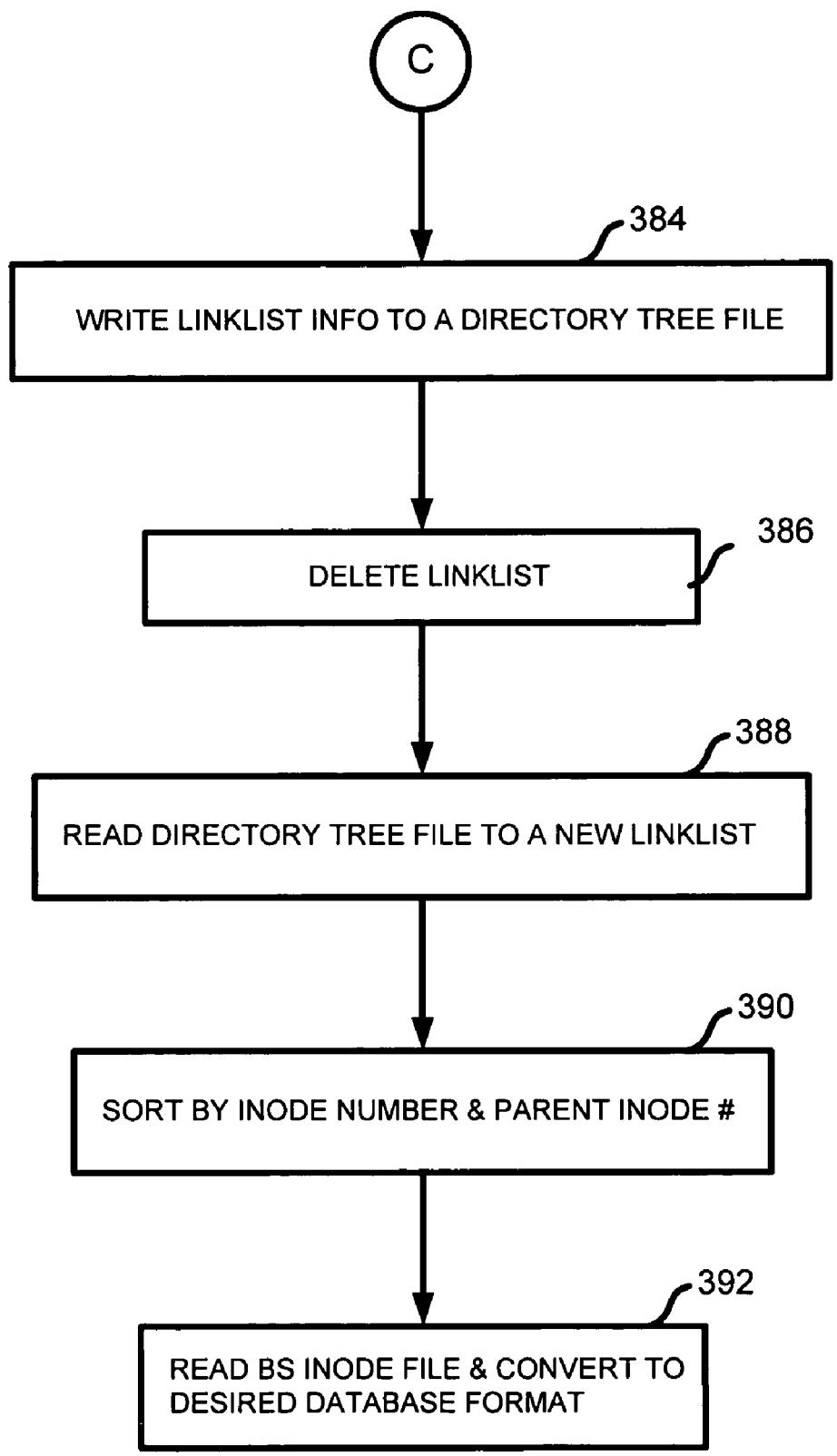

FIG. 2 is a flow diagram of a method according to some embodiments for indexing backup information. In this example, backup is initiated (200). The NAS device backs up its data to the storage device and also sends information (metadata) packets related to the backup to the backup server. Examples of the information related to the content being backed up include the file name, date, size, permissions, the location of the content in the storage media, and any other information that may be helpful to retrieve that particular portion of the backup that is being saved to the storage device.

The packets that are received are counted (202). For example, the NAS device can send the contents of the backup to the storage device and send information packets associated with the contents being backed up to the backup server, and the packets received by the backup server are counted.

It is then determined whether the received packets have a pattern (204). For example, it can be determined whether the packets are being received in a sequential order since the NAS device may send the packets in any order. If the packets being received are not being received in a pattern, then an algorithm suitable for a haphazard order of received packets is used in this example (206). An example of such an algorithm includes using sorting and linklists to organize and convert the received information into a desired database format. For example, if the packets are not received in a particular pattern, then these packets may be organized through sorting and linklists and converted into a database format that the backup server can use later to retrieve a particular file from the storage device.

If, however, the packets are received in a pattern (204), then an algorithm suitable for a patterned series of packets is used in this example (208). An example of such an algorithm includes using an array to organize and convert the received information into a desired database format (208). In one embodiment, an array can be used since the number of received packets is known (202) and proper resources, such as memory space, can be set aside for the array.

According to this embodiment, a more optimal algorithm is used when the packets are received in a pattern than when it is received in a haphazard order.

FIGS. 3A-3D are flow diagrams of a method according to some embodiments for processing an index of a backup media. In this example, a NAS device is prompted to backup its data to a backup media and to send index information of the content of the backup to the backup server (300). File history index is then received from the NAS device (302). An example of the file history index includes the file name, date, size, permissions, and any other aspect of the file that is being backed up, including the location on the backup media for this particular file.

It is then determined whether this is an inode backup (304). Implementation of this determination would be well known to one skilled in the art. An example of an inode backup includes a situation when the file history index information is sent back from the NAS device to the backup server as a stream of two different types of network packets, such as a "DIR" packet and a "NODE" packet. An example of a non-inode backup is a "file backup" which sends a stream of one type of network packet, "FILE" packet, from the NAS device to the backup server.

If it is not an inode backup, it is assumed that it is a file backup and normal file backup algorithms are used in this example (306).

If, however, it is an inode backup (304) then an INODE packet stream is received along with a directory (DIR) packet stream (308). In the example shown in FIG. 1, the NAS device 104 sends the INODE packet stream and the DIR packet stream to the backup server 102, and sends the content of the backup to the storage device 106. In this example, raw index information is transferred from the NAS device 104 to the backup server 102 via an XDR stream of data.

The INODE packet stream includes the inode number, the parent inode number, and all other information regarding the file such as date, time, size, permission, where the file resides on the backup medium, modifier date and time, access time, etc. An inode number, as used herein, includes any identifier, such as a unique number, associated with a particular file in the file system. The parent inode number is an identifier of the directory within which the file is contained. The DIR packet stream includes the inode number, the parent inode number, and the file name, in this example.

The packets received are then counted (310). In some embodiments, the INODE packets are counted and the DIR packets are counted. A header file may be used to record the number of DIR entries, the number of inode entries, and what is the pattern that is detected for each stream. The inode packet stream and the DIR packet stream are analyzed to determine if there is a pattern (312). An example of a pattern is when the INODE packets are received in sequential order.

The inode packets are then stored to the INODE temporary file in the disk and the DIR packets are stored in the DIR temporary file in the disk (314). It is then determined whether there is a pattern, such as a sequential pattern (350). The determination of a pattern includes determining if both the INODE packet stream and the DIR packet stream are received in a pattern. In some embodiments, if the INODE packet stream is received in an ascending inode order, and the DIR packet stream is received in a descending inode order, it is determined that there is a pattern, since both streams are of a sequential pattern. In some embodiments, if one of the streams does not have a pattern and is received in a haphazard order, then it is deemed that there is no pattern.

If there is a pattern, then information from the inode file for inode is placed into a backup server inode file (352). Examples of such information include metadata for a file entry in the file system such as inode, parent inode, last access time, last modified time, size, permissions, etc.

The inode number and related information from the backup server inode file is placed into an array in memory, in this example (354). An example of the related information is the location of the inode information in the backup server inode file. An example of the array in memory includes a field for the inode number, and a field for the location of the inode information in the backup server inode file. The received packet count (310) can be used to determine the size of the array. An example of related information is the inode numbers corresponding offset which identifies the location in the backup media of the contents related to this inode number.

Each entry of the DIR temporary file is then read and the name of the entry is written to the backup server inode file (356). Examples of information to be updated include the file or directory associated with the inode number, the parent directory, the name offset of the name of the entry in the backup server inode file, and the offset of the entry from the array for the backup server inode file.

The inode file entries are then written to a directory tree file (358). In some embodiments, the inode file entries, as well as the offset of entry written to the backup server inode file, and the parent inode file of the DIR packet are also written to the directory tree file. The directory tree file is then read and the information is put into a second array (360). An example of the location of the directory tree file and the second array is in memory. The information in the second array is then sorted and placed in a desired database format (362).

If it is determined that there is no particular pattern to the packet streams (350 of FIG. 3B), then the DIR temporary file is read and information read from the temporary file is stored in a DIR linklist (370). In some embodiments, the name of the entry of the DIR temporary file is written to the backup server inode file. Examples of the information stored in the DIR linklist include the inode number of the DIR temporary file entry and the location of the entry name in the backup server inode file. For example, the DIR linklist may maintain the inode number of the entry, parent inode number of the entry, offset on the backup server inode file where the entry's name was written, and the offset on the backup server inode file where the entry's inode information was written.

The DIR linklist is then sorted (372). For example, the DIR linklist can be sorted based on ascending inode numbers. The inode number in the INODE temporary file is then read (374). The linklist is then searched for the corresponding inode number read from the INODE temporary file (376). The metadata for the inode number is written to the backup server inode file in this example (378). Examples of such metadata include inode, parent inode, last access time, last modified time, size, permissions, etc. In addition, the information in the linklist is updated with the offset on the backup server inode file where the inode information was written (379).

An example of the location of the back up server inode file is the hard disk. It is then determined whether there is a mismatch occurring in the search between the linklist and a corresponding inode number from the INODE temporary file (380). If there is a mismatch, then it is determined that an error has occurred (382). If, however, there is no mismatch (380), then the information in the linklist is written into a directory tree file (384). The linklist is then deleted (386), and the directory tree file is read to a new linklist (388). The new linklist is then sorted by the inode number and the parent inode number (390). For example, the inode numbers and the parent inode numbers can be sorted in ascending order. The back up server inode file is then read and matched with the new sorted linklist and converted to a desired database format (392).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of indexing data comprising:
    receiving packets associated with a backup of content;
    counting the received packets;
    determining, using a processor, whether there is a pattern associated with the received packets; and
    using a first algorithm if it is determined that there is a pattern;
    wherein the pattern is a sequential pattern.
2. The method of claim 1, further comprising using a second algorithm if it is determined that there is no pattern.
3. The method of claim 2, wherein the second algorithm uses a linklist.
4. The method of claim 1, wherein the first algorithm uses an array.
5. The method of claim 4, wherein the array includes an inode number and an associated location in memory.
6. The method of claim 4, wherein the array is in memory.
7. The method of claim 4, further comprising writing contents of the array into a file.
8. The method of claim 7, wherein the file is a directory tree file.
9. The method of claim 7, wherein contents of the file are written into a second array.
10. The method of claim 1, wherein the packets are INODE packets.
11. The method of claim 1, wherein the packets are DIR packets.
12. The method of claim 1, further comprising storing the received packets in a file on disk.
13. A system of indexing data comprising:
    a processor configured to:
        receive packets associated with a backup of content;
        count the received packets;
        determine whether there is a pattern associated with the received packets; and
        use a first algorithm if it is determined that there is a pattern; and
    a memory coupled with the processor, wherein the memory provides the processor with instructions;
    wherein the pattern is a sequential pattern.
14. The system of claim 13 wherein the processor is further configured to use a second algorithm if it is determined that there is no pattern.
15. The system of claim 13, wherein the packets are INODE packets.
16. The system of claim 13, wherein the packets are DIR packets.
17. A computer program product for indexing data, the computer program product being embodied in a computer readable storage medium and comprising computer instructions for:
    receiving packets associated with a backup of content;
    counting the received packets;
    determining whether there is a pattern associated with the received packets; and
    using a first algorithm if it is determined that there is a pattern;
    wherein the pattern is a sequential pattern.
18. A method of indexing data comprising:
    receiving packets associated with a backup of content;
    counting the received packets;
    determining, using a processor, whether there is a pattern associated with the received packets; and
    using a first algorithm if it is determined that there is a pattern;
    wherein the pattern is, an ascending pattern.
19. The method of claim 18, further comprising using a second algorithm if it is determined that there is no pattern.
20. The method of claim 19, wherein the second algorithm uses a linklist.
21. The method of claim 18, wherein the first algorithm uses an array.
22. The method of claim 21, wherein the array includes an inode number and an associated location in memory.
23. The method of claim 21, wherein the array is in memory.
24. The method of claim 21, further comprising writing contents of the array into a file.
25. The method of claim 24, wherein the file is a directory tree file.
26. The method of claim 24, wherein contents of the file are written into a second array.
27. The method of claim 18, wherein the packets are INODE packets.
28. The method of claim 18, wherein the packets are DIR packets.
29. The method of claim 18, further comprising storing the received packets in a file on disk.
30. A system of indexing data comprising:
    a processor configured to:
        receive packets associated with a backup of content;
        count the received packets;
        determine whether there is a pattern associated with the received packets; and
        use a first algorithm if it is determined that there is a pattern; and
    a memory coupled with the processor, wherein the memory provides the processor with instructions;
    wherein the pattern is an ascending pattern.
31. The system of claim 30 wherein the processor is further configured to use a second algorithm if it is determined that there is no pattern.
32. The system of claim 30, wherein the packets are INODE packets.
33. The system of claim 30, wherein the packets are DIR packets.
34. A computer program product for indexing data, the computer program product being embodied in a computer readable storage medium and comprising computer instructions for:
    receiving packets associated with a backup of content;
    counting the received packets;
    determining whether there is a pattern associated with the received packets; and
    using a first algorithm if it is determined that there is a pattern;
    wherein the pattern is an ascending pattern.
35. A method of indexing data comprising:
    receiving packets associated with a backup of content;
    counting the received packets;
    determining, using a processor, whether there is a pattern associated with the received packets; and using a first algorithm if it is determined that there is a pattern;

wherein the pattern is a descending pattern.

36. The method of claim 35, further comprising using a second algorithm if it is determined that there is no pattern.

37. The method of claim 36, wherein the second algorithm uses a linklist.

38. The method of claim 35, wherein the first algorithm uses an array.

39. The method of claim 38, wherein the array includes an inode number and an associated location in memory.

40. The method of claim 38, wherein the array is in memory.

41. The method of claim 38, further comprising writing contents of the array into a file.

42. The method of claim 41, wherein the file is a directory tree file.

43. The method of claim 41, wherein contents of the file are written into a second array.

44. The method of claim 35, wherein the packets are INODE packets.

45. The method of claim 35, wherein the packets are DIR packets.

46. The method of claim 35, further comprising storing the received packets in a file on disk.

47. A system of indexing data comprising:
a processor configured to:
   receive packets associated with a backup of content;
   count the received packets;
   determine whether there is a pattern associated with the received packets; and
   use a first algorithm if it is determined that there is a pattern; and
a memory coupled with the processor, wherein the memory provides the processor with instructions;
wherein the pattern is a descending pattern.

48. The system of claim 47 wherein the processor is further configured to use a second algorithm if it is determined that there is no pattern.

49. The system of claim 47, wherein the packets are INODE packets.

50. The system of claim 47, wherein the packets are DIR packets.

51. A computer program product for indexing data, the computer program product being embodied in a computer readable storage medium and comprising computer instructions for:
receiving packets associated with a backup of content;
counting the received packets;
determining whether there is a pattern associated with the received packets; and
using a first algorithm if it is determined that there is a pattern;
wherein the pattern is a descending pattern.

* * * * *